July 31, 1951     J. E. JOHNSON     2,562,193
HINGED APRON FOR EARTH CARRYING SCOOPS Filed June 17, 1947     2 Sheets-Sheet 1

INVENTOR.
James E. Johnson
BY Victor J. Evans & Co.
ATTORNEYS

July 31, 1951     J. E. JOHNSON     2,562,193
HINGED APRON FOR EARTH CARRYING SCOOPS
Filed June 17, 1947     2 Sheets-Sheet 2
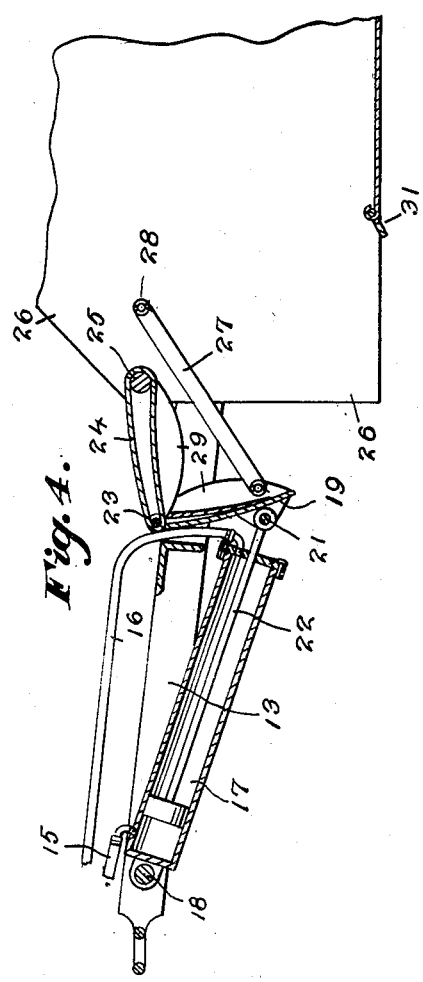
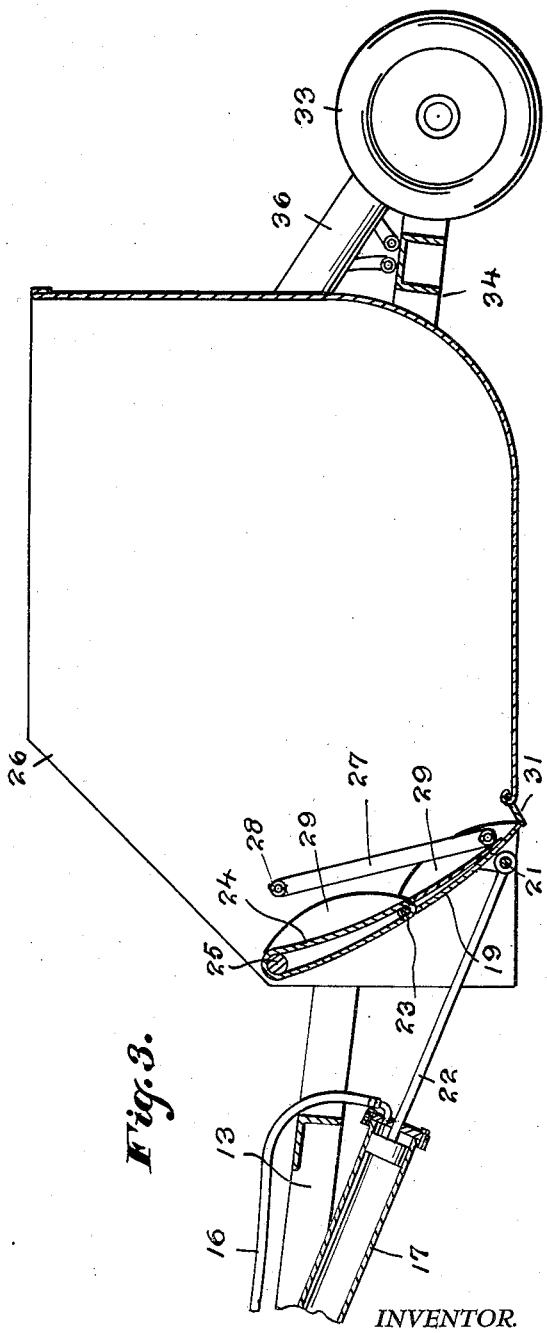
INVENTOR.
James E. Johnson
BY *Victor J. Evans & Co.*
ATTORNEYS Patented July 31, 1951

2,562,193

UNITED STATES PATENT OFFICE 2,562,193

HINGED APRON FOR EARTH CARRYING SCOOPS

James Earl Johnson, South Dos Palos, Calif.

Application June 17, 1947, Serial No. 755,069

3 Claims. (Cl. 37—129)

This invention relates to scraper wagons and more particularly to a hinged apron therefor for closing off the opening after the wagon has been loaded.

It is an object of the present invention to provide a hinged apron or closure device which when raised to the open position will provide adequate view to the operator on the tractor of the opening through which the dirt is extended into the wagon and wherein the closure can be operated by a simple device between the lowered and raised positions.

Other objects of the present invention are to provide a hinged apron or closure element for a scraper wagon which is of simple construction, inexpensive to manufacture and efficient in operation.

For other objects and for a better understanding of the invention, reference may be had to the following detailed description taken in connection with the accompanying drawings, in which Fig. 1 is a top plan view of a scraper wagon employing the hinged apron or closure of the present invention and connected to a tractor to be pulled behind the same.

Fig. 3 is a cross-sectional view taken on line 3—3 of Fig. 1 and looking in the direction of the arrows thereof.

Fig. 4 is a cross-sectional view similar to that shown in Fig. 3 except that the closure or hinged apron has been raised to the open position to permit the entry of dirt into the wagon as the same is pulled by the tractor.

Figure 1:
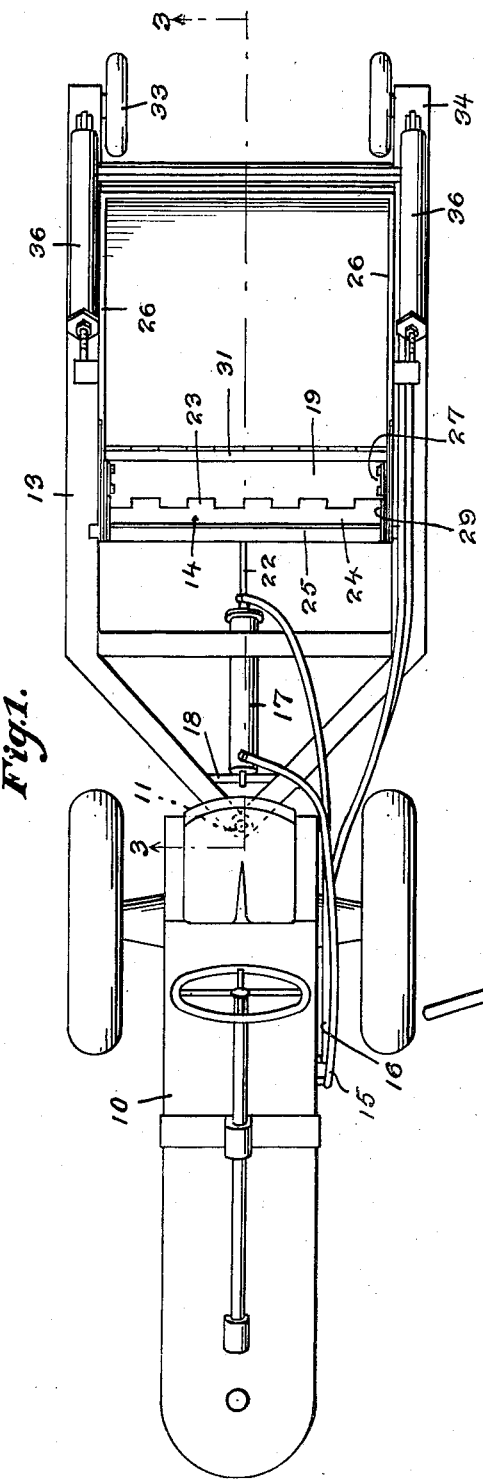
Figure 2:
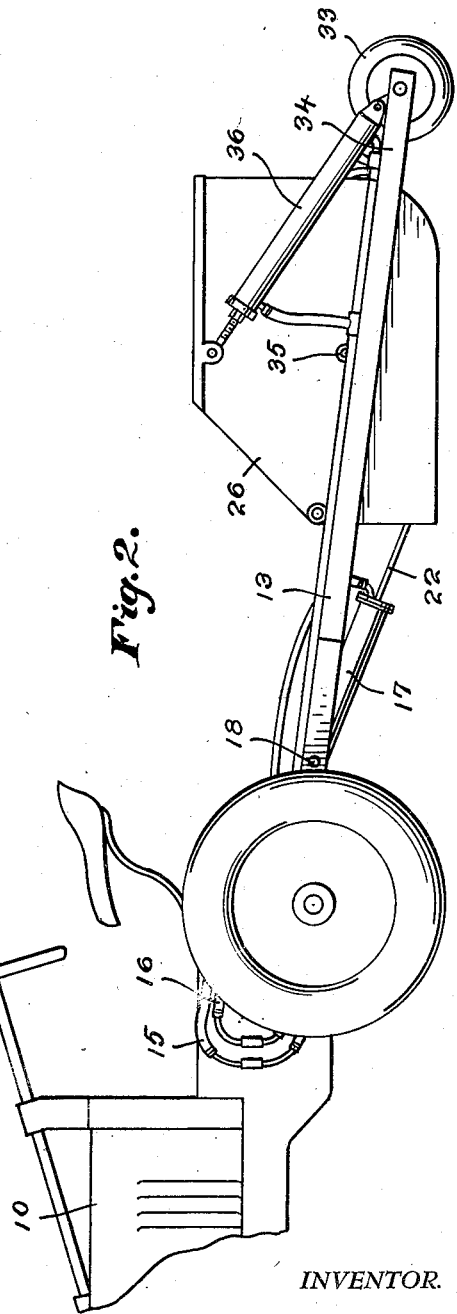
Fig. 2 is a side elevational view of the scraper wagon and the tractor.

Referring now to the figures, 10 represents a tractor having a hitch bar 11 to which the forward end of a scraper wagon 13 employing the hinge apron or closure 14 of the present invention, is connected. The tractor can be of any type and preferably has a device for placing oil or other fluid under pressure to be delivered and returned through hose couplings 15 and 16 to a hydraulic or fluid actuated device 17 connected between a transverse member 18 on the forward end of the scraper wagon and the lower edge of a closure part 19 as indicated at 21. This fluid actuator is of the double acting type. Adequate control can be provided on the tractor for effecting the actuation of the device 17 for the extension of its piston rod 22 to place the closure in the load retaining position and for the retraction of the piston rod 22 whereby to raise the closure device 14.

The lower section or part 19 of the closure device is hinged as indicated at 23 to an upper part 24 of the closure element and this upper part or section 24 is in turn pivoted upon a transversely extending rod or shaft 25 connected between sides 26 of the scraper wagon or carry-all. The hinge connection at 23 is of the piano hinge type so as to prevent the passage of dirt through the closure element between the parts 19 and 24. The bottom part 19 is guided in its rearward and forward movement by a bridle link 27 pivotally connected as indicated at 28 to the side of the scraper body. On each of the parts 19 and 24 there are side extensions 29 which extend inwardly and the bridle link 27 is connected to the side extension 29 of the lower part 19.

On the bottom of the scraper body there is provided a pivotable scraper blade 31 with which the lower edge of the closure part 19 will unite when the closure part is lowered to its closed position.

As the piston rod 22 is retracted, the closure element will be lifted to the position shown in Fig. 4 and the parts 19 and 24 will be pivoted relative to one another. The bridle link 27 will control the upward movement of the lower closure part 19 and will limit its forward movement. It will be apparent that a full view of the opening of the scraper body through which the dirt is extended, can be had. The operator while seated on the tractor can look into the mouth opening of the scraper body when the closure is raised to the position shown in Fig. 4.

The scraper wagon has supporting wheels 33 which are journalled on their side frame pieces 34. The body is pivoted on trunnions 35 connected to the side pieces 34 and can be tilted fore and aft by fluid actuated devices 36.

Having now described my invention, I claim:

1. In a closure for a carryall having a base with a scraper blade on the leading edge and having upwardly extended sides with a frame extended beyond the said leading edge, the combination which comprises a transversely disposed shaft carried by the sides of the carryall and spaced above the base and ahead of the leading scrapping edge thereof, a transversely disposed supporting upper closure section arcuate in cross section pivotally mounted on said shaft and extended from side to side of the carryall, a transversely disposed lower closure section also arcuate in cross section hinged at the upper edge thereof to the lower edge of the said upper section, links pivotally connected to the ends of the lower section and to the lower edge thereof, means pivotally connecting the upper ends of said links to the sides of the carryall and at points spaced from the shaft and substantially in a horizontal plane through the shaft, an actuator arm pivotally connected to the lower edge of the said lower closure section, and means for operating the actuator arm to fold or extend the said closure sections to open and closed positions, respectively.

2. In a closure for a carryall having a base with a scraper blade on the leading edge and having upwardly extended sides with a frame extended beyond the said leading edge, the combination which comprises a transversely disposed shaft carried by the sides of the carryall and spaced above the base and ahead of the leading scrapping edge thereof, a transversely disposed supporting upper closure section arcuate in cross section pivotally mounted on said shaft and extended from side to side of the carryall, a transversely disposed lower closure section also arcuate in cross section hinged at the upper edge thereof to the lower edge of the said upper section, links pivotally connected to the ends of the lower section and to the lower edge thereof, means pivotally connecting the upper ends of said links to the sides of the carryall and at points spaced from the shaft and substantially in a horizontal plane through the shaft, a piston rod pivotally connected to the lower edge of the said lower closure section, and a hydraulic cylinder from which the said piston rod extends whereby the piston rod actuates the closure to folded or extended positions for opening and closing the carryall, respectively.

3. In a closure for a carryall having a base with a scraper blade on the leading edge and having upwardly extended sides with a frame extended beyond the said leading edge, the combination which comprises a transversely disposed shaft carried by the sides of the carryall and spaced above the base and ahead of the leading scraping edge thereof, a transversely disposed supporting upper closure section arcuate in cross section pivotally mounted on said shaft and extended from side to side of the carryall, a transversely disposed lower closure section also arcuate in cross section hinged at the upper edge thereof to the lower edge of the said upper section, said upper and lower closure sections having upwardly extended flanges at the ends, links pivotally connected to the ends of the lower section and to the lower edge thereof, means pivotally connecting the upper ends of said links to the sides of the carryall and at points spaced from the shaft and substantially in a horizontal plane through the shaft, a piston rod pivotally connected to the lower edge of the said lower closure section, and a hydraulic cylinder from which the said piston rod extends whereby the piston rod actuates the closure to folded or extended positions for opening and closing the carryall, respectively.

JAMES EARL JOHNSON.

REFERENCES CITED

The following references are of record in the file of this patent:

UNITED STATES PATENTS

| Number | Name | Date |
| --- | --- | --- |
| 2,304,786 | Armington et al. | Dec. 15, 1942 |
| 2,411,688 | Keim et al. | Nov. 26, 1946 |
| 2,425,664 | Zakel | Aug. 12, 1947 |